United States Patent
Collins et al.

(10) Patent No.: US 8,073,470 B1
(45) Date of Patent: Dec. 6, 2011

(54) PAGING WINDOWS FOR POWER CONSERVATION IN WIRELESS NETWORKS

(75) Inventors: Daniel G. Collins, Plano, TX (US); Amit Gupta, Livermore, CA (US); Jahangir Mohammed, Santa Clara, CA (US)

(73) Assignee: Jasper Wireless, Inc, Sunnyvale, CA (US)

( * ) Notice: Subject to any disclaimer, the term of this patent is extended or adjusted under 35 U.S.C. 154(b) by 993 days.

(21) Appl. No.: 11/377,902

(22) Filed: Mar. 15, 2006

Related U.S. Application Data

(63) Continuation-in-part of application No. 11/047,354, filed on Jan. 31, 2005.

(51) Int. Cl.
*H04W 68/00* (2009.01)

(52) U.S. Cl. ........................ 455/458; 455/574

(58) Field of Classification Search ............. 455/458, 455/574
See application file for complete search history.

(56) References Cited

U.S. PATENT DOCUMENTS

| | | | |
|---|---|---|---|
| 5,301,225 A * | 4/1994 | Suzuki et al. ............ 455/574 |
| 5,420,911 A * | 5/1995 | Dahlin et al. ............ 455/553.1 |
| 5,539,748 A | 7/1996 | Raith | |
| 5,604,744 A * | 2/1997 | Andersson et al. ........ 370/347 |
| 5,627,882 A | 5/1997 | Chien et al. | |
| 5,794,137 A * | 8/1998 | Harte ..................... 455/343.4 |
| 5,809,421 A * | 9/1998 | Manssen et al. .......... 455/434 |
| 5,884,196 A | 3/1999 | Lekven et al. | |
| 6,021,122 A | 2/2000 | Tiedemann, Jr. | |
| 6,078,819 A | 6/2000 | Ciccone et al. | |
| 6,289,227 B1 * | 9/2001 | Shi ........................ 455/574 |
| 6,366,195 B1 * | 4/2002 | Harel et al. ............. 340/7.21 |
| 6,480,504 B1 | 11/2002 | Wang et al. | |
| 6,542,743 B1 * | 4/2003 | Soliman .................. 455/436 |
| 6,650,912 B2 | 11/2003 | Chen et al. | |
| 6,725,067 B1 * | 4/2004 | Marx et al. .............. 455/574 |
| 6,799,030 B2 * | 9/2004 | Barber et al. ............ 455/343.1 |
| 6,823,192 B2 * | 11/2004 | Jou et al. ................ 455/458 |
| 6,947,405 B2 * | 9/2005 | Pitcher et al. ........... 370/338 |
| 7,034,853 B2 * | 4/2006 | Cho et al. ............... 345/1.3 |
| 2001/0015963 A1 * | 8/2001 | Tuomainen et al. ....... 370/311 |
| 2002/0082010 A1 * | 6/2002 | Koorapaty et al. ....... 455/434 |
| 2004/0063442 A1 * | 4/2004 | Goldberg ................ 455/458 |
| 2004/0152475 A1 | 8/2004 | Kim | |
| 2004/0209628 A1 | 10/2004 | Laroia et al. | |
| 2004/0229605 A1 * | 11/2004 | Hwang et al. ........... 455/426.1 |
| 2004/0254980 A1 | 12/2004 | Motegi et al. | |
| 2005/0148348 A1 * | 7/2005 | Cramby et al. .......... 455/458 |

(Continued)

OTHER PUBLICATIONS

ETSI Standard 03.60 Digital Cellular Telecommunication Systems (Phase 2+); General Packet Radio Service (GPRS) Service description, Stage 2 (GSM 03.60 version 7.4.1 Release 1998).

ETSI Standard 04.08 Digital Cellular Telecommunication Systems (Phase 2+); Mobile Radio Interface Layer 3 Specification, pp. 1-172. (GSM 04.08 version 7.4.2 Release 1998).

(Continued)

*Primary Examiner* — Charles Appiah
*Assistant Examiner* — Jaime Holliday
(74) *Attorney, Agent, or Firm* — Blakely Sokoloff Taylor & Zafman, LLP

(57) ABSTRACT

Improved paging for wireless networks is disclosed. A wireless terminal clock is synchronized to a server clock. A paging window and a dormant window are set for communicating between the server and the wireless terminal using the synchronized time. The paging window and the dormant window are set using a set of instructions. During the paging window, a control channel for a cellular network is found by the wireless terminal, and a page is received from the server at the wireless terminal.

31 Claims, 6 Drawing Sheets

U.S. PATENT DOCUMENTS

2006/0148493 A1* 7/2006 Narasimha et al. ........... 455/458

OTHER PUBLICATIONS

ETSI Standard 03.13 Digital Cellular telecommunication systems (Phase 2+); Discontinuous Reception (DRX) in the GSM System (GSM 03.13 version 8.0.0 Release 1999).

ETSI Standard 05.02 3rd Generation Partnership Project; Technical Specification Group GSM/EDGE Radio Access Network; Multiplexing and Multiple Access on the Radio Path (Release 1999).

Peter H Dana, Department of Geography, University of Texas at Austin. Global Positioning System Overview; http://uregina.ca/~sauchyn/geog411/global_positioning_systems.html.

* cited by examiner

PAGING WINDOWS FOR POWER CONSERVATION IN WIRELESS NETWORKS

This application is a continuation in part of co-pending U.S. patent application Ser. No. 11/047,354 entitled PAGING FOR NON-REAL-TIME COMMUNICATIONS USING CELLULAR NETWORKS filed Jan. 31, 2005.

BACKGROUND OF THE INVENTION

The cellular system was primarily designed to deliver voice and data services to the users. Users require real-time responses—that is, when a far end user calls a Wireless Terminal, they expect the Wireless Terminal to ring right away. The cellular system is designed to meet this need by having the Wireless Terminal look for pages frequently (once every second or so). Cellular networks send pages for specific Wireless Terminals in specific frames, and Wireless Terminals may be configured to wake-up only during that specific frame to look for this page and may sleep rest of the time. (A page is an indication from the cellular network to the Wireless Terminal that someone wants to communicate with it; a page is typically followed by the establishment of a communication session). The cellular network requires the Wireless Terminal to wakeup frequently, every second or so, in order to meet the responsiveness requirements of the user. This consumes substantial battery power at the Wireless Terminal. In today's cellular network, a typical Wireless Terminal in standby mode (that is when merely listening for pages and not having any data or voice communication sessions) depletes the battery within a few days to a few weeks depending on the particulars of the Wireless Terminal.

However, there are also a number of applications that can use wireless networks that do not require a real-time response; it is acceptable for the far end to reach the Wireless Terminal(s) within a few seconds, minutes, or hours rather than right away (referred to hereafter as non-real-time communication). For example, a machine manufacturer may want to download new data into a machine in the field occasionally, where it is sufficient for this new data to reach the machine within an hour. Or as another example, a courier may want to periodically track the location of a piece of cargo which has a GPS location device and Wireless Terminal, etc. There is significant value in increasing the battery life of Wireless Terminals for such applications by leveraging the fact that this type of communication does not require instantaneous response. But, requiring substantial changes to existing cellular network paging methods only for these non-real-time applications is very expensive and impractical. It would be useful if paging methods could be devised which can substantially increase the battery life of Wireless Terminals without imposing substantial changes on the existing cellular network.

BRIEF DESCRIPTION OF THE DRAWINGS

Various embodiments of the invention are disclosed in the following detailed description and the accompanying drawings.

DETAILED DESCRIPTION

Figure 1:
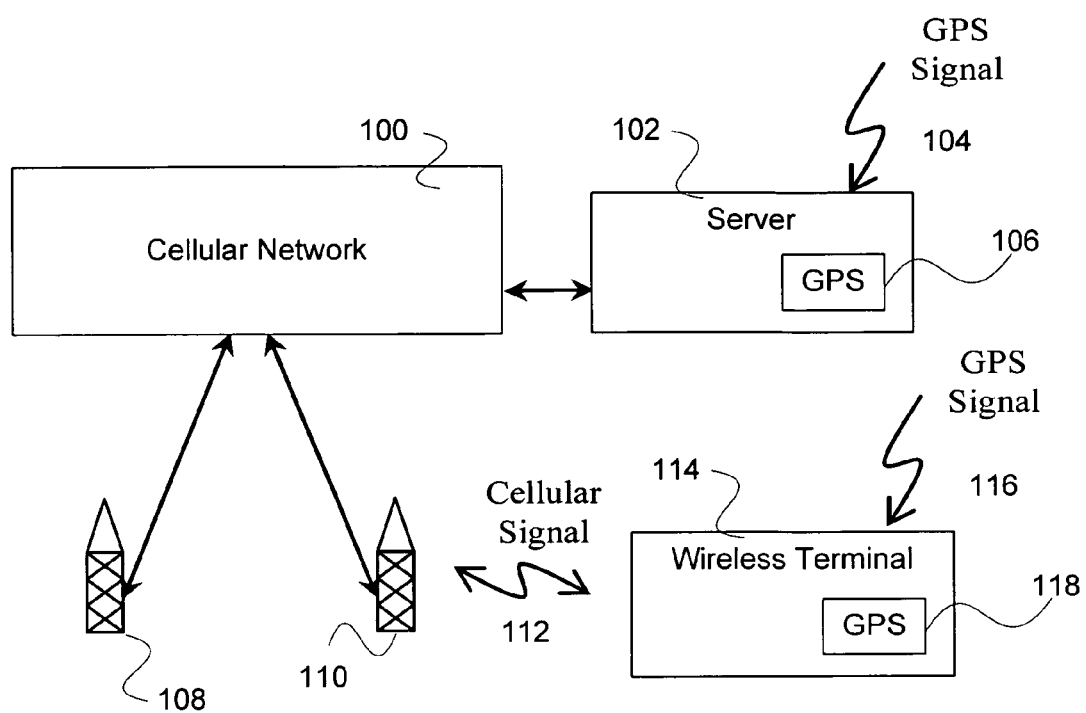
FIG. 1 is a block diagram illustrating an embodiment of a system for paging for wireless networks.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An improved technique for paging for wireless networks is disclosed. Wireless terminals are configured to listen for a page for only a short duration when in standby mode. During the standby mode that is not part of the short duration when listening for a page, the wireless terminal can disable portions of its circuitry in order to run using less power. The wireless terminal and the other portions of the wireless network both understand when the short duration periods for paging are. In some embodiments, a set of instructions is executed both on the wireless terminal and on a network server that indicates when a wireless terminal is expected to be listening for pages or transmitting messages during the standby mode. In various embodiments, the set of instructions for when the listening/transmitting short duration of the standby mode has as parameters one or more of the following: wireless terminal ID, frame number, broadcast parameters from the cellular network, and subscriber ID. In some embodiments, a page request from the cellular network includes the wireless terminal ID number for which the page is destined or addressed to.

In some embodiments, a wireless terminal clock and an internal or external server clock are synchronized; a paging window and a dormant window for communicating between the server and the wireless terminal are derived using the synchronized time; during the paging window, a control channel is found for a cellular network by the wireless terminal; and, a page may be received at the wireless terminal from the server. In various embodiments, synchronizing a wireless terminal clock and an internal or external server internal clock comprises the server sending a synchronizing signal to the wireless terminal or synchronizing the server internal clock to an external time reference and synchronizing the wireless terminal to the external time reference. In various embodiments, the external time reference comprises a global positioning system (GPS) time or an Internet time reference via network time protocol (NTP).

FIG. 1 is a block diagram illustrating an embodiment of a system for paging for wireless networks. In the example shown, server 102 is connected to cellular network 100. In various embodiments, cellular network 100 comprises a communication network that communicates using one or more of the following protocols: global system for mobile communication (GSM), general packet radio service (GPRS), enhanced data rates for global evolution (EDGE), code division multiple access (CDMA), time division multiple access (TDMA), wideband code division multiple access (WCDMA), and any other appropriate wireless communication protocol.

In FIG. 1, in various embodiments, server 102 is connected to the following cellular network elements: in the GSM/GPRS network it can be connected to the SGSN (Serving GPRS Service Node) or GGSN (Gateway GPRS Service Node) or BSC (Base Station Controller), or MSC (Mobile Switching Center); in the CDMA network it can be connected to HA (Home Agent), PDSN (Packet Data Service Node) or BSC (Base Station Controller); in the UMTS (Universal Mobile Telecommunications System) network it can be connected to SGSN, GGSN or RNC (Radio Network Controller).

In FIG. 1, Server 102 includes a GPS 106 that receives GPS signal 104. In some embodiments, GPS 106 comprises a global positioning system receiver that provides a time and position signal to server 102. In some embodiments, server 102 does not include GPS 106 and time and position information is provided to server 102 from other sources such as preprogrammed position information and time information from the Internet using NTP (Network Time Protocol RFC-1305) or any other appropriate time reference. Cellular network 100 is connected to one or more base stations, represented in FIG. 1 by 108 and 110. The base stations communicated with one or more wireless terminals, represented by wireless terminal 114 in FIG. 1. Wireless terminal 114 is able to receive communication service from cellular network 100 whenever it is within the coverage area of an authorized cellular service provider via a base station. Wireless terminal 114 includes GPS 118 which receives GPS signal 116. In some embodiments, GPS 118 comprises a global positioning system receiver that provides a time and position signal to wireless terminal 114. In some embodiments, wireless terminal 114 does not include GPS 118 and time and position information is provided to wireless terminal 114 from other sources such as position information from the nearest base station and time information from a base station (such as base station 108 or 110), server 102, the Internet using NTP (Network Time Protocol RFC-1305), or any other appropriate time reference. Wireless terminal 114 comprises an internal clock, a cellular modem and a processor. In some embodiments, the internal clock of wireless terminal 114 is synchronized to the time signal from GPS 118. In some embodiments, wireless terminal 114 is battery powered.

In some embodiments, server 102 and wireless terminal 114 maintain internal clocks that are synchronized periodically. In various embodiments, synchronization is achieved by: both the Server and the Wireless Terminal independently receive clock from the same source such as GPS Satellites, both the Server and the Wireless Terminal receive clock from the Internet (for example, using Network Time Protocol RFC-1305), and the Server sends the time to the Wireless Terminal. In some embodiments, the wireless terminal clock is synchronized to a server clock by synchronizing the server clock to a first external time reference and synchronizing the wireless terminal to a second external time reference, where the first and second external time references are known and/or expected to be synchronized with each other.

In some embodiments, a server processor synchronizes a server clock with a time reference and derives a paging and a dormant window for communicating with a wireless terminal; a wireless terminal processor synchronizes a wireless terminal clock with a time reference and derives a paging and a dormant window for communicating with a server via a cellular network; a wireless terminal communicates with a server using a receiver and a transmitter to receive pages from and transmit pages to a server.

In the description below the paging system is described in the context of the GSM/GPRS cellular system. Although the paging system is described in the context of the GSM/GPRS cellular system, in various embodiments the paging system can be implemented in conjunction with other cellular systems including enhanced data GSM environment (EDGE), code division multiple access (CDMA), time division multiple access (TDMA), wideband code division multiple access (WCDMA), and any other appropriate wireless communication protocol.

In various embodiments, the base station requires that the wireless terminal to indicate it is alive and connected at periodic intervals (a location update), at irregular intervals, and/or at power up. In some embodiments, if the wireless terminal does not provide a location update in a periodic manner, the cellular network will start communications up again with the wireless terminal and deliver messages that have been queued up during the time when the cellular network could not deliver messages or pages to the wireless terminal. In various embodiments, the SGSN, a network router, a network device, and/or the server holds messages or pages for a wireless terminal in a queue if the messages or pages are not able to be delivered. In some embodiments the location update is provided by the wireless terminal in a manner that is flexible to the base station. In some embodiments, the location update parameters (for example, times, frequencies, etc.) are broadcast on the control channel.

Figure 2A:
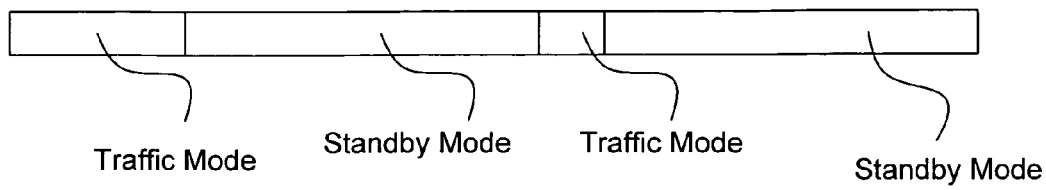
FIG. 2A is a block diagram illustrating an example of a mode allocation for a system for paging in a wireless network.

FIG. 2A is a block diagram illustrating an example of a mode allocation for a system for paging in a wireless network. In the example shown, the wireless terminal (for example, wireless terminal 114 of FIG. 1) operates in two modes: traffic mode and standby mode. During traffic mode, the wireless terminal is communicating with the cellular network (for example, cellular network 100 in FIG. 1) in an active voice or data communication session. The traffic mode comprises the standard traffic mode for a cellular network. In some embodiments, during the paging window of the standby mode, the wireless terminal is monitoring for pages destined for it from the cellular network. In some embodiments, during the standby mode the wireless terminal is either in a dormant window or in a paging window. For the period of the dormant window, the wireless terminal is in a deep sleep mode. In some embodiments, only the time clock, the external interrupt monitoring and the timers are running. Therefore, the power consumption during the dormant window is extremely small.

Figure 2B:
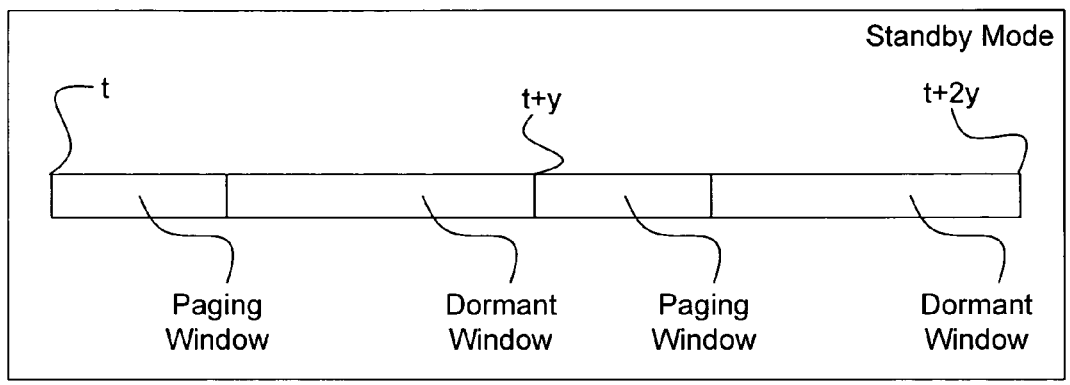
FIG. 2B is a block diagram illustrating an example of a time allocation for a system for paging in a wireless network in one embodiment.

FIG. 2B is a block diagram illustrating an example of a time allocation for a system for paging in a wireless network in one embodiment. In the example shown, the paging method divides the time into a paging window and a dormant window. The first paging window starts at time t. The first paging window ends and the second paging window starts at time t+y. The second paging window ends at time t+2y. In this example, the paging and dormant windows are a fixed time in length (length in time=y). In some embodiments, this division is the $1^{st}$ tier of paging. In some embodiments, the start times and the stop times of the paging windows and the dormant windows are determined by a set of instructions with parameters including one or more of the following: the current time, the wireless terminal identification number (for example, international mobile subscriber identifier), international mobile equipment identifier (for example, device type), and broadcast parameters. In some embodiments, the set of instructions is run on a server and wireless terminal (such as server 102 and wireless terminal 114 of FIG. 1, respectively) so that both have the same definitions of the paging and dormant windows. In some embodiments, the paging load of wireless terminals in the network is distributed by having any given wireless terminal only interacting with the network during its short paging window which occurs sporadically as dictated by a set of instructions. In various embodiments, the set of instructions is a fixed set of instructions, is a changeable set of instructions, and/or is a downloadable set of instructions.

In the paging window of FIG. 2B, the cellular network (for example, cellular network 100 of FIG. 1) operates in the manner typically employed (for example, the standard network paging method, referred to herein as the $2^{nd}$ tier of paging, is used). In the dormant window of FIG. 2B, the cellular network does not interact with the wireless terminal; the wireless terminal is made dormant by disabling all or part of its circuitry in order to consume less power. In various embodiments, in the dormant mode the wireless terminal shuts down all circuitry or shuts down all circuitry except that it leaves one or more of the following powered on: its internal clock circuitry, its timer circuitry, and its circuitry to monitor external interrupts. In some embodiments, the clock rate of the circuitry is lowered (for example, divided by two, four, etc.) in order to lower power consumption. In some embodiments, the paging window is very short compared to the dormant window—for example, the paging window is a few seconds and the dormant window is many hours—enabling very low power consumption. It should be noted that the larger the dormant window, the longer it would take for a message to be sent or received from a wireless terminal. In various embodiments, the dormant window and paging window are the same lengths over time, change over time (for example, flexible windows, intervals, periods, etc.), are agreed upon between the server and the wireless terminal (such as server 102 and wireless terminal 114 in FIG. 1, respectively), are set by the wireless terminal, are set by the server, are set using a set of instructions, are set using a set of instructions that is downloaded from the server to the wireless terminal, and/or are signaled indirectly by another control signal.

Figure 3:
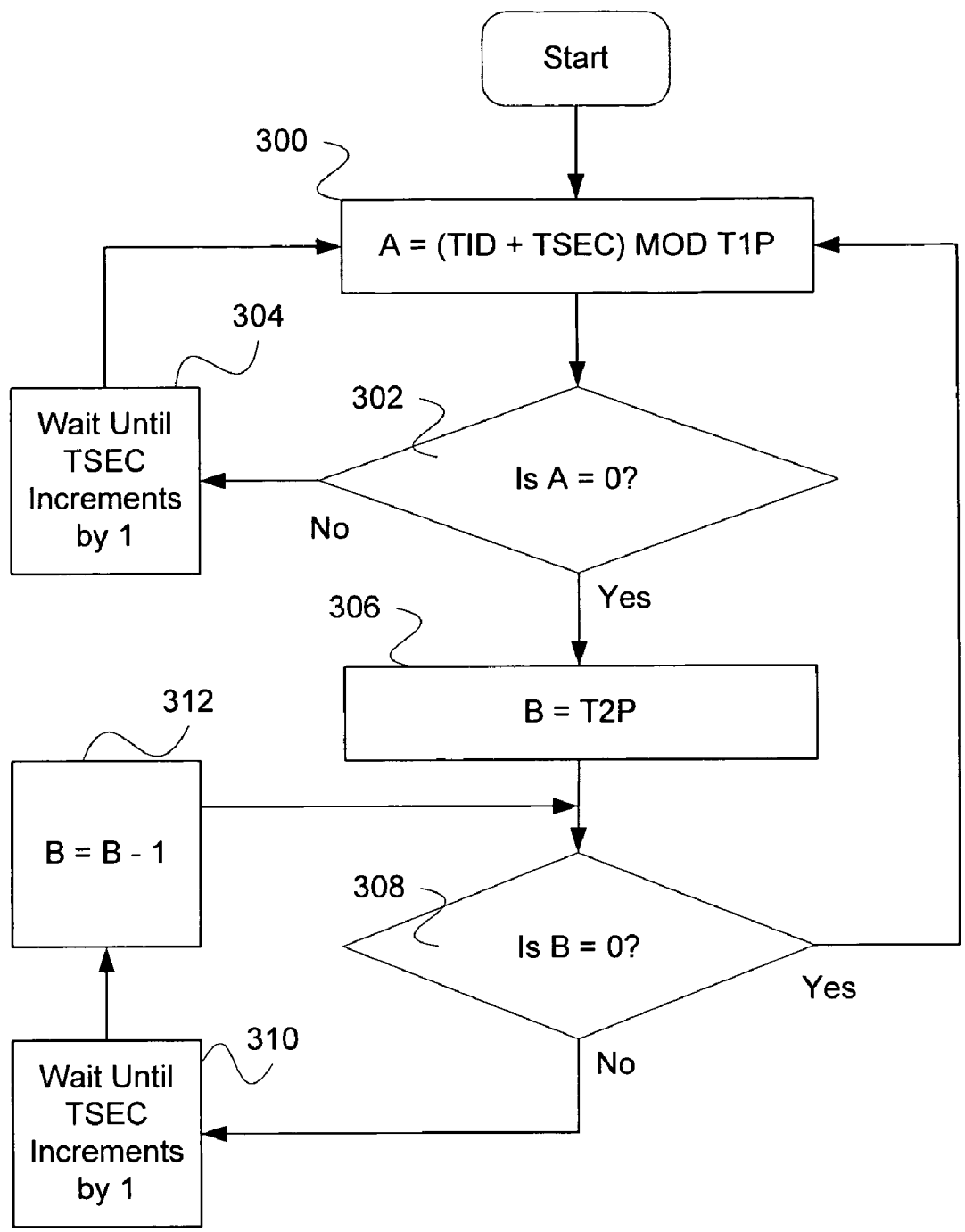
FIG. 3 is a flow diagram illustrating an embodiment of a set of instructions for determining the paging and dormant windows for a system for paging in a wireless network.

FIG. 3 is a flow diagram illustrating an embodiment of a set of instructions for determining the paging and dormant windows for a system for paging in a wireless network. In the example shown, in 300 variable A is computed using the wireless terminal identification number (TID), the Current time in Seconds (TSEC=HH*60*60+MM*60+SS, where HH is hours ranging from 0 to 23, MM is minutes ranging from 0 to 59, and SS is seconds ranging from 0 to 59) and the period for the $1^{st}$ Tier Period (T1P). Variable A is the result of the sum of TID and TSEC modulo T1P. In various embodiments, the function for variable A is a function of one or more of the following parameters: TID, TSEC, T1P, and the access control class for the wireless terminal. In various embodiments, the function for variable A comprises a combination of one or more of various functions, including, but not limited to: modulus function, bit-wise XOR function, bit-shifting, addition and multiplication. A is a number between 0 and (T1P−1). In 302, it is determined if A is equal to 0. If A is not equal to 0, then in 304 the process waits until TSEC has incremented one more second and control passes to 300. If A is equal to 0, then in 306 B is set equal to T2P. In 308, it is determined if B is equal to 0. If B is not equal to 0, then in 310 the process waits until TSEC has incremented one more second, in 312 B is decremented by 1, and control passes to 308. If B is equal to 0, then control passes to 300.

In the example shown in FIG. 3, the modulo operation to compute Variable A accomplishes two objectives: it establishes the $1^{st}$ tier periodicity and it makes the start of the page window to be different instants for different wireless terminals (an effect achieved by adding the TID to the TSEC before the modulo operation). This makes the paging window for different wireless terminals to start at different times. This distribution of paging windows over time is essential to maximize the use of the paging capacity of the cellular network. In this example, the paging window periodicity is T1P and the time length, or duration, of the paging window is T2P. Also, A reaching zero marks the end of the Dormant Window and the Paging Window begins. When B reaches zero, the Paging Window ends and the Dormant Window begins.

In some embodiments, the server (for example, server 102 in FIG. 1) transmits the two parameters, Tier-1 Period (T1P) and Tier-2 Period (T2P), that allows the variation of the length of the dormant window and the paging window durations anytime from the server. For example, depending on the demands of the application, the Wireless Terminal can be set with different T1P values from the server. So, if the dormant window is set to be one hour for a specific wireless terminal, then for a far end that wants to send a page to that wireless terminal, the page may have to wait at the server up to 1 hour. So if the application requires longer battery life from the wireless terminal and the page can tolerate a long wait to send a page to that wireless terminal, then the T1P value can be set so that the paging window period is long.

Figure 4:
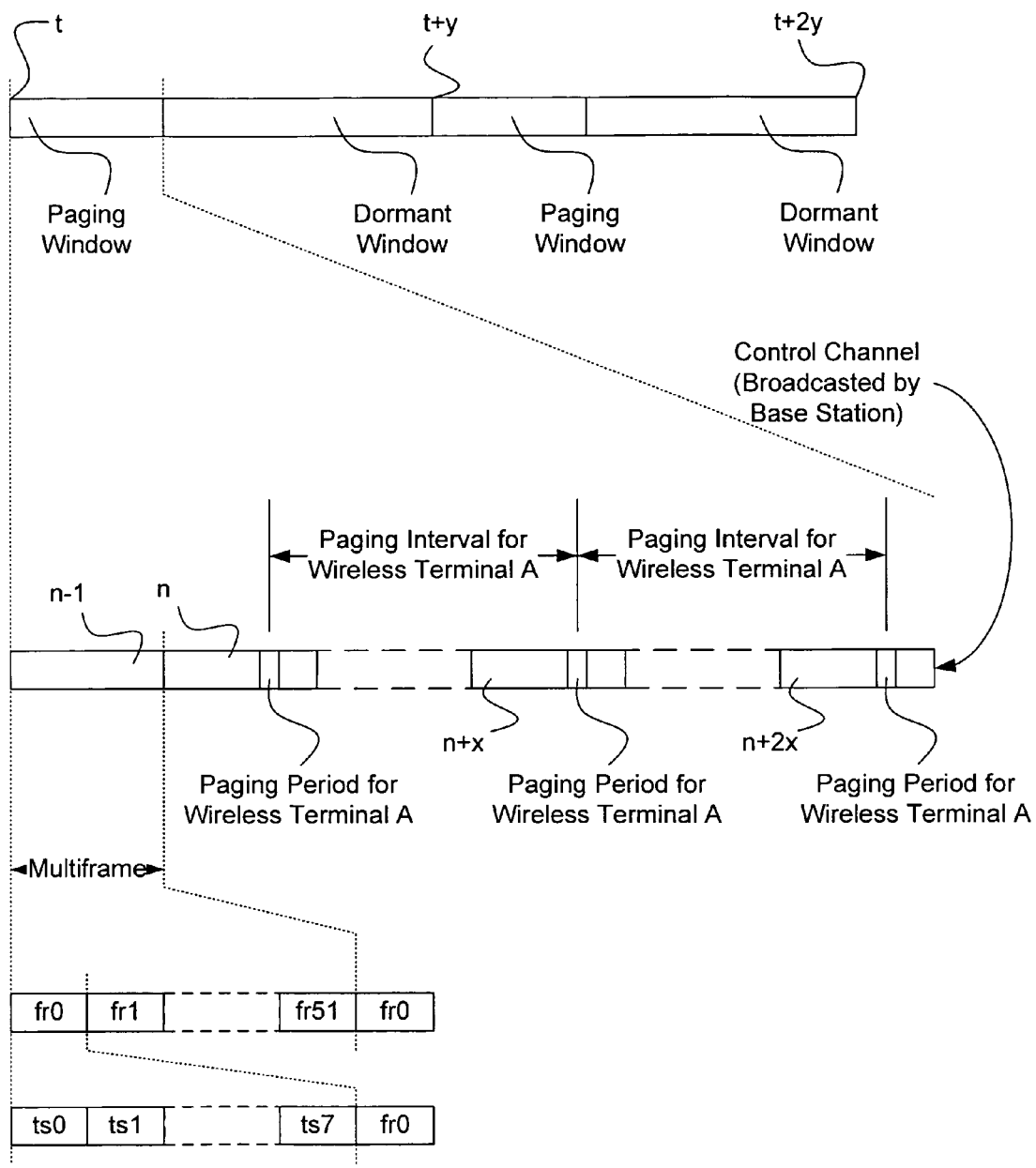
FIG. 4 is a block diagram illustrating an example of a time allocation for a system for paging in a wireless network in one embodiment.

FIG. 4 is a block diagram illustrating an example of a time allocation for a system for paging in a wireless network in one embodiment. In the example shown, a number of multiframes occur in the paging window. Multiframes are labeled in FIG. 4 by n−1, n, n+x, and n+2x. The control channel broadcasts the multiframes from base stations. There are 52 frames that are grouped into a multiframe. Frames are represented by the frames fr0, fr1, fr51, and fr0 in FIG. 4. There are 8 time slots that are grouped into a frame. Time slots are represented by ts0, ts1, ts7, and ts0 in FIG. 4. There are three paging periods for a specific wireless terminal, which are labeled paging period for wireless terminal A in FIG. 4). There are two intervals between the paging periods, which are labeled paging interval for wireless terminal A.

In the example shown, for a wireless terminal A, the cellular network schedules a page only at a particular frame within a specific multiframe, and only once in every so many multiframes. The exact instant of the paging period and the interval between the page is derived using a set of instructions where parameters that are input into the set of instructions include one or more of the following: the wireless terminal identification number, broadcasted parameters from the Cellular Network, and the time. The set of instructions is independently run at the cellular network or the server (for example, cellular network 100 or server 102 of FIG. 1, respectively) and at the wireless terminal so both can know when the paging period occurs. In some embodiments, the paging period and paging interval shown in FIG. 4 are on the order of few milliseconds and few hundred milliseconds, respectively.

In some embodiments, the ratio of paging window to dormant window determines the overall power consumption. The smaller the ratio, the lower the power consumption. One way to reduce power consumption is to increasing size of dormant window (which increases the response time); the other is to reduce the paging window. When a wireless terminal wakes-up from dormant mode, it needs to listen and synchronize to the control channel of the cell within which the terminal presently resides. Since the dormant window can be a long period of time, the wireless terminal could have moved multiple cells away during this period. It is therefore important to provide a process for rapid searching for the control channel upon wake up from the dormant mode.

Figure 5:
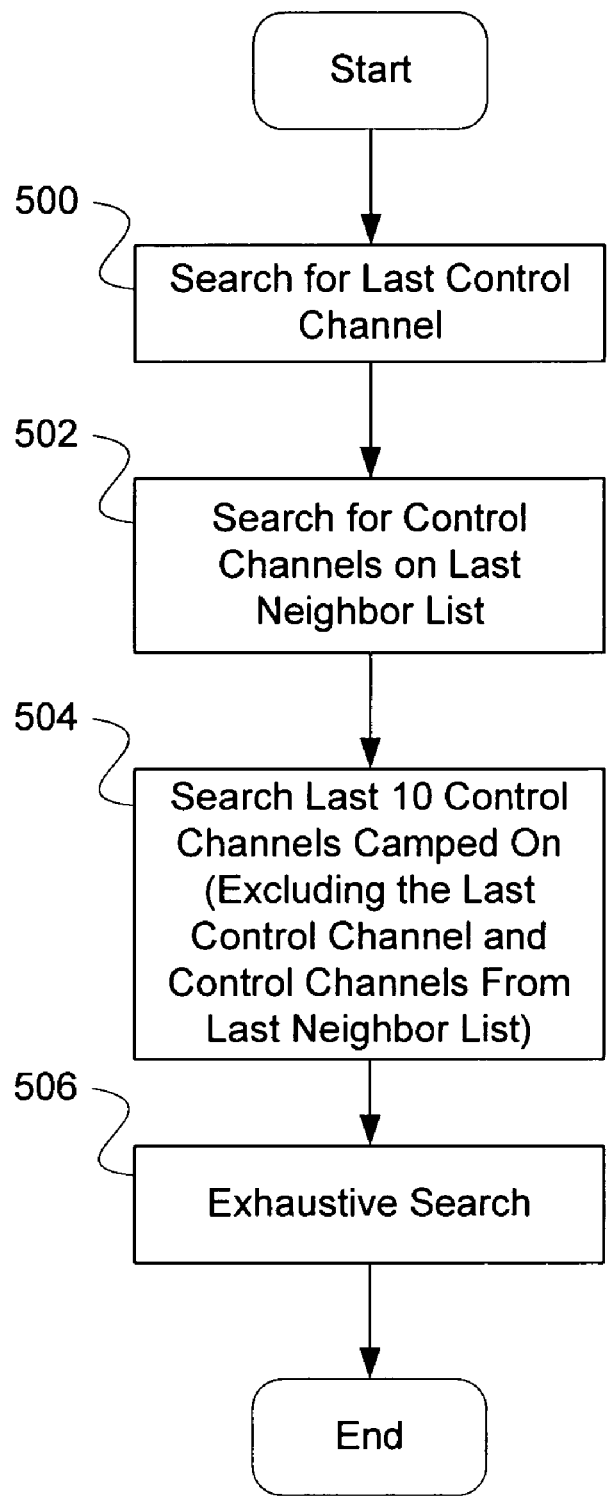
FIG. 5 is a flow diagram illustrating an embodiment of a process to search for a communication channel for a system for paging in a wireless network.

FIG. 5 is a flow diagram illustrating an embodiment of a process to search for a communication channel for a system for paging in a wireless network. In the example shown, in 500 the wireless terminal (for example, wireless terminal 114 in FIG. 1) searches for a control channel to communicate with the network (for example, cellular network 100 in FIG. 1) first by trying the last channel. In 502, the last neighbor list (a list of channels neighboring the last channel) is searched for a control channel on which to communicate with the cellular network. In some embodiments, the control channel in the cellular system broadcasts the control channel numbers of the surrounding cells (called the neighbor list). In 504, the last 10 control channels camped on excluding the last control channel and control channels on the last neighbor list. In 506, an exhaustive search is performed for a control channel. In various embodiments, the process searches a list of control channels based on a location provided by GPS location information, a list of control channels based on a location provided by the cellular network (for example, by receiving a signal from a nearby base station), a list of control channels from all past locations, and/or a list of control channels from a list of anticipated locations or preprogrammed locations.

Figure 6:
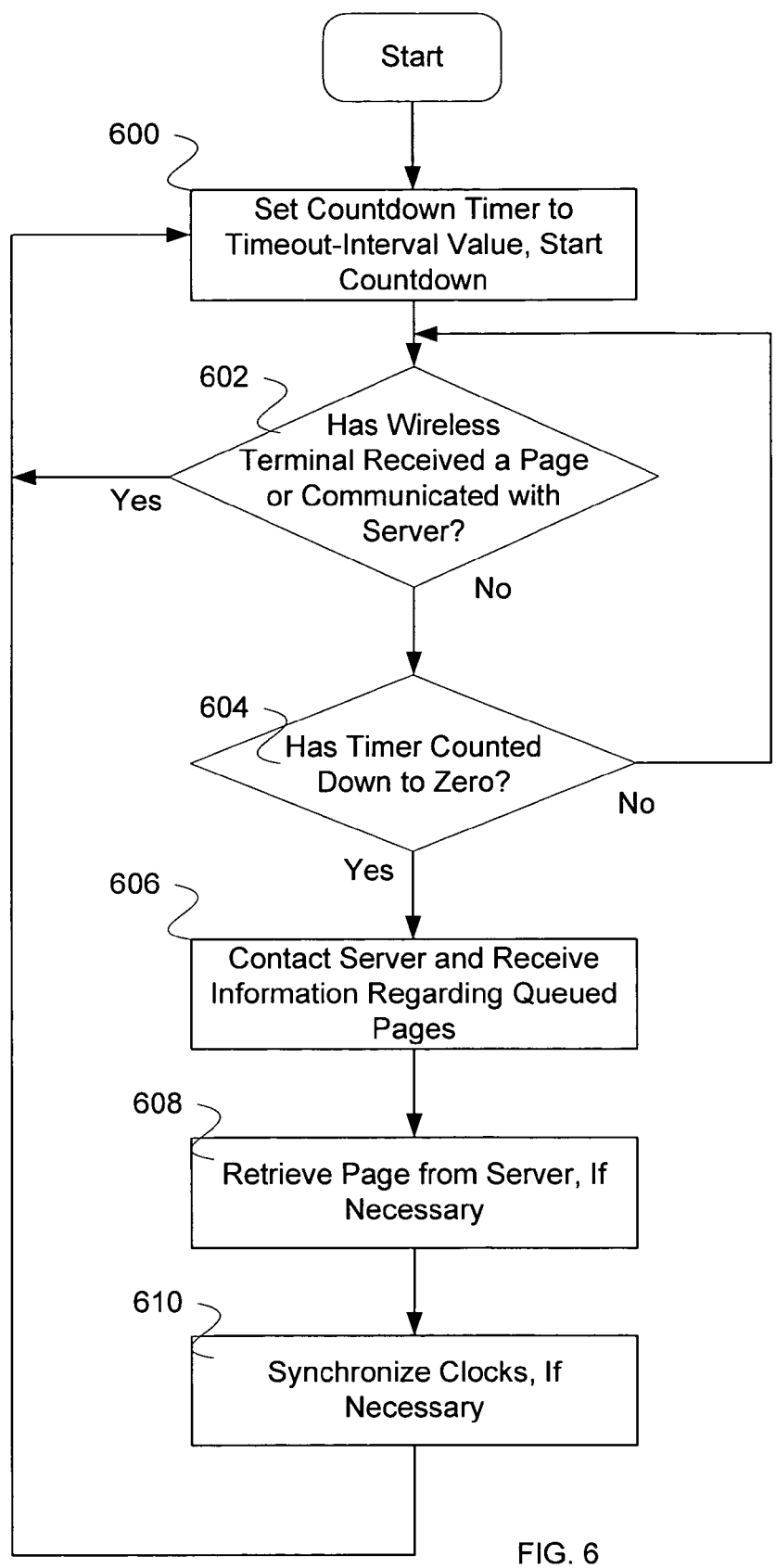
FIG. 6 is a flow diagram illustrating an embodiment of a process for ensuring synchronization between the wireless terminal and the server.

FIG. 6 is a flow diagram illustrating an embodiment of a process for ensuring synchronization between the wireless terminal and the server. If a wireless terminal and a server are not synchronized—for example, if the clock on the wireless terminal is inaccurate due to temperature changes, then there is a possibility that the wireless terminal and server will not have synchronized dormant window and paging windows. This could lead to a situation where the wireless terminal and server do not communicate. In the example shown, in 600 a countdown timer is loaded with a timeout interval value and started. The countdown timer establishes a timeout window, which if the wireless device has not received a page or has communicated with the server, the wireless terminal will initiate communication with the server and check to see if there are any queued pages for it and check to see if its clock is still synchronized with the server or requires recalibration by communication with the server. In 602, it is determined if the wireless terminal has received a page or has communicated with the server. In the event that the device has received a page or has communicated with the server, then control passes to 600. In the event that the wireless terminal has not received a page or has not communicated with the server, then control passes to 604. In 604, it is determined if the countdown timer has counted down to zero. If the countdown timer has not counted down to zero, then control passes to 602. If the countdown timer has counted down to zero, then in 606, the server is contacted and information is retrieved regarding queued pages. In 608, pages are retrieved from the server by communicating with the server to see if any pages are queued for being sent to the wireless terminal and if so they are retrieved. In 610, the clocks of the server and the wireless terminal are synchronized if they are not already synchronized, and control passes to 600. In various embodiments, the communication with the server uses a packet switched network such as GPRS, EDGE, WCDMA, a paging network such as SMS, or any other appropriate network. In some embodiments, the communication with the server enables the wireless terminal the server to change the paging window, the dormant window, and/or the timeout window during the communication with the server. In some embodiments, the communication with the server enables the wireless terminal to recalibrate its clock.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of paging for wireless networks comprising:
 synchronizing a window clock of a wireless terminal to a server window clock, wherein the server window clock is separate from and is only synchronized periodically with the window clock of the wireless terminal;
 determining whether the wireless terminal is in a traffic mode or a standby mode;
 in the event that the wireless terminal is in standby mode, determining whether the window clock of the wireless terminal indicates that the wireless terminal is in a paging window or in a dormant window using a set of instructions, wherein the paging window has a duration at least as long as a duration from a start of a first paging slot to an end of a second paging slot between the wireless terminal and the server such that the paging window overlaps at least one paging slot between the wireless terminal and a base station, and wherein the dormant window has a duration greater than at least twice a period between the first paging slot and the second paging slot, wherein the period between the first paging slot and the second paging slot is based at least in part on a paging clock of the base station or a paging clock of the wireless terminal; and
 in the event that the wireless terminal is in the dormant window, maintaining sleep of the circuitry of the wireless terminal and not waking up circuitry for any paging slots between the wireless terminal and the server;
 in the event that the wireless terminal is in the paging window:
  waking up circuitry to receive and to respond to the page;
  determining a paging interval and a paging period, wherein the paging interval is based at least in part on a function of the wireless terminal identifier, a time, and a first paging period to distribute a paging load of the wireless network;
  listening for the page during the paging period occurring at a time based at least in part on the paging interval;
  receiving the page from the server at the wireless terminal if and only if a message is sent from the server to the wireless terminal; and
  causing the circuitry of the wireless terminal to sleep.

2. A system of paging for wireless networks comprising:
 a wireless terminal, wherein the wireless terminal includes a window clock;
 a server for a cellular network, wherein the server includes a window clock, wherein the window clock of the server clock is separate from and is only synchronized periodically with the window clock of the wireless terminal; and a processor; and a memory coupled with the processor, wherein the memory is configured to provide the processor with instructions which when executed cause the processor to:

synchronize a clock of a wireless terminal to a server clock;

determine whether the wireless terminal is in a traffic mode or a standby mode;

in the event that the wireless terminal is in standby mode, determine whether the clock of the wireless terminal indicates that the wireless terminal is in a paging window or in a dormant window using a set of instructions, wherein the paging window has a duration at least as long as a duration from a start of a first paging slot to an end of a second paging slot between the wireless terminal and the server such that the paging window overlaps at least one paging slot between the wireless terminal and a base station, and wherein the dormant window has a duration greater than at least twice a period between the first paging slot and the second paging slot, wherein the period between the first paging slot and the second paging slot is based at least in part on a paging clock of the base station or a paging clock of the wireless terminal; and in the event that the wireless terminal is in the dormant window, maintaining sleep of the circuitry of the wireless terminal and not waking up circuitry for any paging slots between the wireless terminal and the server;

in the event that the wireless terminal is in the paging window:

wake up circuitry to receive and to respond to the page;

determine a paging interval and a paging period, wherein the paging interval is based at least in part on a function of the wireless terminal identifier, a time, and a first paging period to distribute a paging load of the wireless network;

listen for the page during the paging period occurring at a time based at least in part on the paging interval;

receive the page from the server at the wireless terminal if and only if a message is sent from the server to the wireless terminal; and cause the circuitry of the wireless terminal to sleep.

3. A system as recited in claim 2, wherein the set of instructions is set by the server.

4. A system as recited in claim 2, wherein the set of instructions is set by the wireless terminal.

5. A system as recited in claim 2, wherein the set of instructions is downloaded from the server to the wireless terminal.

6. A system as recited in claim 2, wherein the set of instructions is selected by a control signal.

7. A system as recited in claim 2, wherein the set of instructions includes a modulo function.

8. A system as recited in claim 2, wherein the set of instructions includes a bitwise-XOR function.

9. A system as recited in claim 2, wherein the set of instructions includes using a wireless terminal identifier as a parameter.

10. A system as recited in claim 2, wherein the set of instructions includes using a subscriber identifier as a parameter.

11. A system as recited in claim 2, wherein the set of instructions includes using the synchronized time as a parameter.

12. A system as recited in claim 2, wherein the set of instructions includes using a paging window periodicity as a parameter.

13. A system as recited in claim 2, wherein the set of instructions includes using a time length of the paging window as a parameter.

14. A system as recited in claim 2, wherein the set of instructions is a fixed set of instructions.

15. A system as recited in claim 2, wherein finding the control channel for the cellular network includes searching a list of control channels based on a location provided by GPS location information.

16. A system as recited in claim 2, wherein finding the control channel for the cellular network includes searching a list of control channels based on a location provided by the cellular network.

17. A system as recited in claim 2, wherein finding the control channel for the cellular network includes searching a list of control channels from all past locations.

18. A system as recited in claim 2, wherein finding the control channel for the cellular network includes searching a list of control channels based on anticipated locations.

19. A system as recited in claim 2, wherein finding the control channel for the cellular network includes searching a preprogrammed list of control channels.

20. A system as recited in claim 2, further comprising providing to a base station from the wireless terminal a location update.

21. A system as recited in claim 2, wherein synchronizing the wireless terminal clock to the server clock comprises synchronizing the wireless terminal clock to a first external time reference and synchronizing the server clock to a second external time reference, wherein the first and second external time references are synchronized with each other.

22. A system as recited in claim 2, wherein during the dormant window the clock rate is lowered to conserve power.

23. A system as recited in claim 2, wherein the processor is further configured to initiate communication with the server if no page has been received within a timeout interval.

24. A system as recited in claim 23, wherein the communication includes information to synchronize the wireless terminal window clock to the server window clock.

25. A system as recited in claim 23, wherein the communication includes information to recalibrate the wireless terminal window clock.

26. A system as recited in claim 23, wherein the communication includes information about pages to be sent to the wireless terminal.

27. A system as recited in claim 23, wherein the communication includes information to change one or more of the following: the paging window, the dormant window, and the timeout interval.

28. A system as recited in claim 23, wherein the communication uses a packet switched network.

29. A system as recited in claim 23, wherein the communication uses one or more of the following: a GPRS packet switched network, an EDGE packet switched network, and a WCDMA packet switched network.

30. A system as recited in claim 23, wherein the communication uses a paging network.

31. A system as recited in claim 23, wherein the communication uses a SMS paging network.

* * * * *